Nov. 28, 1961   A. M. MOEN   3,010,474
FAUCET AND MOUNTING
Filed June 20, 1958
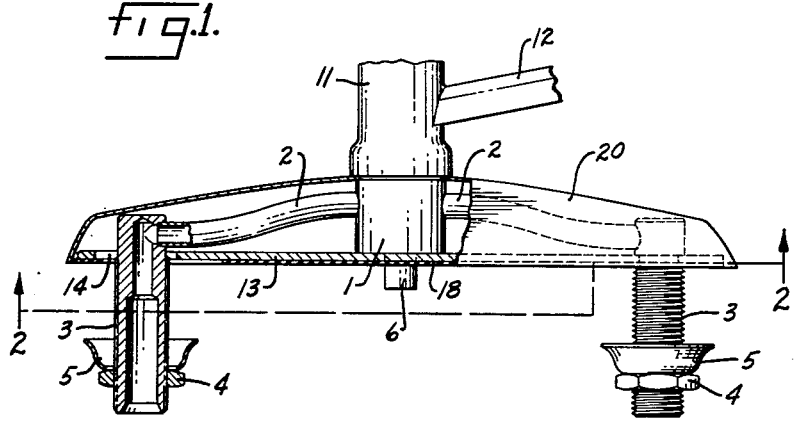
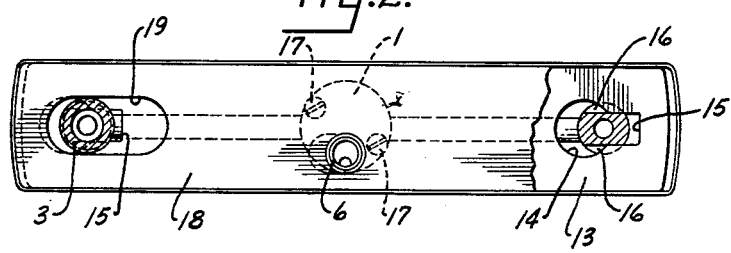
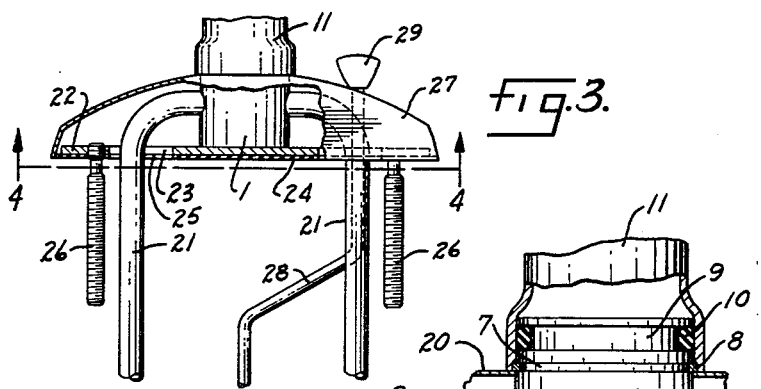
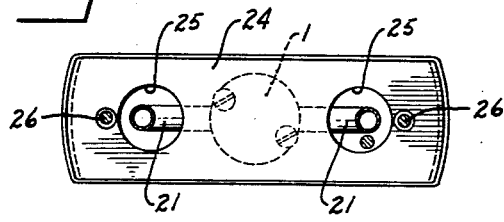
INVENTOR.
ALFRED M. MOEN,
BY
*Parker and Carter*
ATTORNEYS.

3,010,474
FAUCET AND MOUNTING
Alfred M. Moen, 151 Lakeview Drive, R.D. 1,
Grafton, Ohio
Filed June 20, 1958, Ser. No. 743,411
10 Claims. (Cl. 137—359)

This invention relates to a faucet mounting and to the means for mounting the faucet on a sink or other suitable place.

One object of the invention is therefore to provide a faucet mounting structure.

Another object is to provide a faucet mounting structure so arranged that it can be assembled with a minimum of effort and with security.

A still further object is to provide such a construction whereby the faucet assembly may be taken apart and dismounted when necessary with a minimum of operation.

Other objects will appear from time to time during the course of the specification and claims.

The invention is illustrated more or less diagrammatically in the accompanying drawings wherein:

FIG. 1 is a vertical section with parts in elevation showing one form of the device;

FIG. 2 is a plan view with parts in section and parts broken away taken at line 2—2 of FIG. 1;

FIG. 3 is a view generally similar to FIG. 1 but showing a modified form;

FIG. 4 is a plan generally similar to FIG. 2 but showing the structure of FIG. 3; and FIG. 5 is a vertical sectional detail showing the structure of FIG. 1.

Like parts are indicated by like numerals throughout the specification and drawings.

As shown in FIGS. 1, 2 and 5, the device comprises a faucet preferably of the mixing faucet type and arranged with a single spout and a single control means. The latter is not shown as it forms no essential part of the invention.

1 is a valve body to which a plurality of inlets 2, 2 are connected. Liquid, for example hot and cold water, is discharged into the valve body through the inlet pipes or connections. Each inlet pipe 2 is connected to an exteriorly threaded nipple 3. Nuts 4 may be positioned on the nipple and annular members 5 may also be positioned on the nipples above the nuts 4. 6 is a nipple in communication with the valve body 1 through which fluid may be discharged when desired. The nipple, when present, is normally intended for use with a spray hose. The mounting of the faucet is not affected by the presence or absence of the nipple 6.

A valve mechanism is mounted in the body 1 but is not shown as its details form no essential part of the invention.

The body is grooved as at 7, as shown in FIG. 5, and a snap ring or other retaining member 8 may fit into this groove. The body is also grooved as at 9 and a sealing member or O-ring 10 may be received therein. A housing 11 is positioned exteriorly of the upper end of the body 1 and includes, or is connected to or carries a spout 12. The details of the mounting of the housing 11 are omitted. The valve and the valve housing are omitted from the showing of FIG. 5. Generally speaking it is sufficient to say that a sleeve or other valve member extends upwardly from the valve body 1, but since the details of the faucet mounting are not limited to the details of the valve assembly the latter have been omitted. Means (not shown) are provided for holding the housing 11 in position on the valve body and for permitting rotation of the housing with respect to the valve body.

A deck plate 13 is provided with slots or openings 14, as shown particularly in FIGS. 1 and 2. It is perforated also to permit the nipple 6 to extend through it.

As shown in FIG. 2 in particular, at the right-hand end of that figure, the openings 14 in the deck plate are provided with generally rounded sections and with generally flattened or narrowed sections 15.

The nipples 3 are slotted as at 16 on each side of each nipple and thus the slotted sections of the nipples may fit into the narrowed sections 15 of the openings 14.

The body 1 is provided with tapped openings to receive the screws 17 by means of which the body 1 and the deck plate 13 are secured together.

Beneath the deck plate a packing member 18 may be mounted and this member is provided with elongated slots or openings 19, as shown in detail at the left-hand end of FIG. 2.

The housing or finishing shell 20, as shown in FIG. 1 in particular, is positioned over the body 1 and is held in place by the snap ring 8 or other comparable member. As shown, the housing 20 covers all of the parts thus far described and encloses the deck plate 13 and the packing member 18.

As shown in FIG. 3, the body 1 and the housing 11 are the same as above described. The inlets 21, 21 for hot and cold water lead to the body 1 but come from below rather than from the side as shown in FIG. 1. The deck plate 22 is provided with elongated or otherwise shaped openings 23. The inlet tubes 21 are not slotted and the deck plate is therefore not keyed to the inlet passage members 21. A packing member of rubber or other comparable material 24 is positioned beneath the deck plate 22 and is provided with openings 25, as shown in FIG. 4, 26, 26 are threaded studs which are secured to the deck plate 22 and extend through the packing member 24. In the form of FIGS. 3 and 4 the faucet structure is secured in place to a sink or other mounting by means of the studs 26 rather than by means of the threaded nipples 3 of FIGS. 1 and 2. A finishing and enclosing shell 27 is positioned about the parts thus described and is held in place in the same manner as is the shell 20 of FIGS. 1 and 5.

The deck plate, the member 27 and the packing member 24 may be perforated to receive an angular discharge connection 28 with a handle 29. This member is used to open and close a drain for the sink, or other structure to which the device is connected.

Although an operative form of the device has been shown, the invention is not limited to the particular details shown. Many changes may be made in the form, shape and arrangement of parts without departing from the spirit of the invention.

The use and operation of the invention are as follows:

In general the structure shown is a mixing faucet, fluid coming into a central housing 1 through a plurality of inlets being mixed therein and being discharged through the spout 12 or other spout under the control of a valving mechanism (not sthown). The invention is not limited to any particular valving means.

In general such devices comprise what might be called working parts or essential operating parts and finishing, enclosing or covering parts. The device itself, so far as the operating parts are concerned, has no ornamental appearance and is strictly utilitarian. The finishing parts are intended to enclose and secure the device and to provide a relatively ornamental appearance. As shown, the inlet pipes and the member 1 are secured together and form an assembly which may be secured on a sinkboard or drainboard or other base. Such a base is provided with openings through which the members 3 will extend. Usually it is advisable to apply a sealing means and the member 13, which is of rubber or comparable material, is used. It is positioned over the members 3 and may be contacted by the deck plate 13 which will normally be of rigid material and may be of metal. It also fits over the members 3 and is provided with the enlarged rounded openings 14 from each of which a narrow or narrower portion 15 extends. The members 3 are slotted, as shown in dotted lines at the left of FIG. 2 and in full at the right of that figure. To assemble the deck plate on the working parts the two are brought together, the members 3 being thrust through the openings 14. When the slots 16 in the members 3 are opposite or in register with the narrowed portions 5, the deck plate is moved so that the slots 16 engage the narrowed portions and the deck plate is thus held in place with respect to the operating members.

The shell 20 is moved into place and the snap ring 8 is then engaged in the groove 7 and the shell is held in place. Thereafter the spout housing 12 is put into position, as shown in FIG. 5. It is held in place about the valve assembly in any desired means and the invention is not limited to any particular means for so holding it in place.

When the device in the form of FIGS. 1, 2 and 5 is to be used the members 4 and 5 are removed from the threaded inlet connections 3. The inlet connections are placed through suitable openings in a sinkboard or other mounting and the nuts 4 are tightened to hold the assembly in fixed relationship with respect to the sinkboard or other support. By this means the entire device is readily assembled with a minimum of parts and a minimum of tools. The working parts are properly retained and properly positioned and an ornamental enclosure is furnished to conceal and cover the working parts.

In the form of FIGS. 3 and 4 the function of the several parts is substantially the same as that above described. However, the inlet pipes 21 do not serve as the fastening means. Threaded studs 26 serve as the fastening means and they pass through suitable openings in the deck plate 22 and, also, they pass through suitable openings in the sinkboard or other mounting. In view of this construction it is not necessary to slot either the members 21 or the members 26. Nuts (not shown) are mounted upon the threaded studs 26 and by tightening the nuts the assembly is held in position upon the sinkboard or other mounting means. The shell 27 is held in place with respect to the member 1 by a snap ring 8 which is the same as that shown in FIG. 5.

In addition to the structure shown in FIG. 1, a drain outlet operating means appears in FIGS. 3 and 4 and it includes the rod 28 which passes through suitable openings in the shell 27, the deck plate 22, the sealing means 24 and the drainboard or other mounting upon which the assembly is secured.

I claim:

1. In combination in a faucet assembly a body and a plurality of inlet members connected thereto, said inlet members including an exteriorly slotted part, said body being provided with an exterior groove, a deck plate having a hole for each such inlet member, at least one hole comprising a relatively large portion and a relatively narrow portion, said narrow portion closely fitting the slotted part of the inlet member, a shell overlying the body, the deck plate and the inlet members enclosing them at least in part, a member removably positioned within said groove and engaging said shell and holding it in place, and a housing positioned on said body and about last mentioned member.

2. In combination, means defining a faucet assembly and including a body and a plurality of inlet members connected thereto, said inlet members including an exteriorly slotted part, said body being provided with an exterior groove, a deck plate having a hole for each such inlet member, one hole comprising a relatively large portion and a relatively narrow portion, said narrow portion closely fitting within the slotted part of the inlet member, a shell overlying the body, the deck plate and the inlet members and enclosing them at least in part, a member removably positioned within said groove and engaging said shell and holding it in place, a housing on said body enclosing said last mentioned member, and attaching means positioned on said inlet members and adapted to secure said inlet members to a support.

3. In combination in a faucet assembly a body and a plurality of inlet members connected thereto, said inlet members including an exteriorly slotted part, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet members and enclosing them at least in part, a ring removably positioned within said groove and engaging said shell and holding it in place, and a housing on said body exterior of said shell and enclosing said ring.

4. In combination in a faucet assembly a body and a plurality of inlet members connected thereto, said inlet members including an exteriorly slotted part, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet member and enclosing them at least in part, a retaining member removably positioned within said groove and engaging said shell and holding it in place, a housing positioned on said body exterior of said shell and about said retaining member, and attaching means positioned on said inlet members and securing said inlet members to a support.

5. In combination in a faucet assembly a body and a plurality of inlet members connected thereto, said inlet members including threaded, exteriorly slotted parts, said body being provided with an exterior groove, a deck plate having a hole for each such inlet member, each hole comprising a relatively large portion and a relatively narrow portion, said narrow portion closely fitting the slotted part of the inlet member, a shell overlying the body, the deck plate and the inlet members and enclosing them at least in part, a ringlike member removably positioned within said groove and engaging said shell and holding it in place, and a housing mounted on said body and about said ringlike member.

6. In combination in a faucet assembly a body and a plurality of inlet members connected thereto, said inlet members including parallel, exteriorly slotted parts, said body being provided with an exterior groove, a deck plate having a hole for each such inlet member, each hole comprising a relatively large portion and a relatively narrow portion, said narrow portion closely fitting the slotted part of the inlet member, a shell overlying the body, the deck plate and the inlet members and enclosing them at least in part, a retaining member removably positioned within said groove and engaging said shell to hold it in place, and a housing positioned on said body and about said retaining member.

7. In combination in a faucet assembly a body and a plurality of inlet members connected thereto, said inlet members including parallel threaded, exteriorly slotted parts, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet members and enclosing them at least in part, a ringlike member removably positioned within said groove and engaging said shell to hold it in place, and a housing positioned on said body and about said ringlike member.

8. In combination, means defining a faucet assembly and including a body and a plurality of inlet members connected thereto, said inlet members including parallel threaded, exteriorly slotted parts, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet members and enclosing them at least in part, a retaining member removably positioned within said groove and engaging said shell and holding it in place, a housing mounted on said body and surrounding said retaining member, and attaching means positioned on said inlet members and adapted to secure said inlet members to a support.

9. In combination in a faucet assembly a body and a plurality of inlet members connected thereto, said inlet members including parallel threaded, exteriorly slotted parts, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet members and enclosing them at least in part, a ring removably positioned within said groove and engaging said shell and holding it in place, and a housing positioned on said body exterior of said shell and enclosing said ring.

10. In combination, means defining a faucet assembly and including a body and a plurality of inlet members connected thereto, said inlet members including parallel threaded, exteriorly slotted members, said body being provided with an exterior groove, a deck plate having a hole for each such inlet member, each hole comprising a relatively large portion and a relatively narrow portion, said narrow portion entering and closely fitting the slotted part of the inlet member, a shell overlying the body, the deck plate and the inlet members and enclosing them at least in part, a spring member removably positioned within said groove and engaging said shell and holding it in place, a housing carried on said body exterior of said shell and enclosing said spring member, and attaching means positioned on said inlet members and adapted to secure said inlet members to a support.

References Cited in the file of this patent
UNITED STATES PATENTS

| | | |
|---|---|---|
| 431,791 | Aldrich | July 8, 1890 |
| 1,728,769 | Pasman | Sept. 17, 1929 |
| 2,314,950 | Pope | Mar. 30, 1943 |